(12) United States Patent
Kataoka (10) Patent No.: US 8,228,768 B2
(45) Date of Patent: Jul. 24, 2012

(54) OPTICAL DISC DEVICE AND OPTICAL DISC RECORD REPRODUCING METHOD

(75) Inventor: Takeyoshi Kataoka, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1013 days.

(21) Appl. No.: 11/801,942

(22) Filed: May 10, 2007

(65) Prior Publication Data

US 2008/0089199 A1    Apr. 17, 2008

(30) Foreign Application Priority Data

Oct. 13, 2006  (JP) .................................. 2006-279445

(51) Int. Cl.
   *G11B 20/00*    (2006.01)
   *G11B 17/00*    (2006.01)
(52) U.S. Cl. ...................................... 369/47.3; 369/239
(58) Field of Classification Search .......................... None
   See application file for complete search history.

(56) References Cited

U.S. PATENT DOCUMENTS

| 6,633,524 | B1 * | 10/2003 | Yoshida ........................ 369/47.4 |
| 2002/0039335 | A1 | 4/2002 | Masaki et al. | |
| 2004/0037187 | A1 * | 2/2004 | Kondo et al. ............... 369/47.33 |
| 2007/0121444 | A1 * | 5/2007 | Takeda et al. ................ 369/47.4 |

FOREIGN PATENT DOCUMENTS

| JP | 07-244942 A | 9/1995 |
| JP | 2000-173153 | 6/2000 |
| JP | 2002-109822 A | 4/2002 |
| JP | 2003-051123 | 2/2003 |
| JP | 2003-141732 | 5/2003 |
| JP | 2006-209820 A | 8/2006 |

OTHER PUBLICATIONS

Japan Patent Office office action for patent application JP2006-279445 (Apr. 13, 2010).
Japan Patent Office (JPO) office action for JPO patent application JP2006-279445 (Aug. 31, 2009).

* cited by examiner

*Primary Examiner* — Mohammad Ghayour
*Assistant Examiner* — Carl Adams
(74) *Attorney, Agent, or Firm* — Kilpatrick Townsend & Stockton LLP (57) ABSTRACT

When record or reproduction quality of an optical disc is deteriorated, an enhancement in the performance is implemented by slowing down record or reproduction speed of the optical disc. However, there still exists a problem of how to select and determine a timing with which the speed is to be modified. In the present invention, the modification of the speed is performed with a seek processing selected and used as its trigger, and depending on various conditions at that time. Simultaneously, information recording area of the optical disc is separated into a plurality of zones. Then, when an optical pickup passes though a zone switching portion therebetween, the seek processing is inserted, thereby being used as the trigger for the speed modification.

4 Claims, 10 Drawing Sheets

OPTICAL DISC DEVICE AND OPTICAL DISC RECORD REPRODUCING METHOD

INCORPORATION BY REFERENCE

The application claims the benefit of priority of Japanese Application No. 2006-279445, the disclosure of which also is entirely incorporated herein by reference.

BACKGROUND OF THE INVENTION

1. Field of the Invention

The present invention relates to an optical disc device and an optical disc record reproducing method.

2. Description of the Related Art

For example, JP-A-2003-141732 exists as a related art in the present technological field. In the present publication, there has been a description regarding PCAV (Partial Constant Angular Velocity) scheme.

Also, e.g., JP-A-2000-173153 exists as a related art in the present technological field. In the present publication, there has been a description: "There is provided an optical disc device which is capable of reproducing an optical disc at high speed and with certainty".

Also, e.g., JP-A-2003-51123 exists as a related art in the present technological field. In the present publication, there has been a description: "There is provided a disc driving device which, when reproducing RTR-scheme data recorded in a DVD-RAM standard disc, allows the real-time reproduction to be performed without breaking the image or voice halfway. This reproduction is performed by controlling the read processing speed into an optimum value."

SUMMARY OF THE INVENTION

As methods for controlling the revolution velocity of an optical disc in an optical disc device, there exist the following schemes: CAV (Constant Angular Velocity) scheme for controlling the number of revolutions of the optical disc into a constant number, CLV (Constant Linear Velocity) scheme for controlling the optical disc so that the recording linear velocity becomes a constant linear velocity, the PCAV (Partial Constant Angular Velocity) scheme where the CAV scheme and the CLV scheme are co-used, and the like.

In the CAV scheme, a high-speed access is executable, because the number of revolutions of the optical disc need not be changed at the time of a seek operation. The linear velocity, however, becomes faster as the position changes to a more outer circumference of the disc. Accordingly, there exists a problem that laser power runs short, and that the recording quality is deteriorated.

In the CLV scheme, the optical disc is rotationally controlled so that the recording linear velocity becomes a constant linear velocity. Accordingly, no waste will occur in a recording area, and thus the maximum recording capacity can be implemented. However, the number of revolutions at the time of recording data into an inner circumference of the disc turns out to become larger as compared with the number of revolutions at the time of recording data into an outer circumference thereof. Consequently, the optical disc device vibrates, and thus the recording quality is deteriorated. At the worst, there exists a danger that the disc itself is damaged by centrifugal force.

The PCAV scheme means the following scheme: Namely, in order to implement the high-speed access and large recording capacity, the CAV scheme is employed unless the linear velocity exceeds a maximum linear velocity at the position heading from the inner circumference of the disc to the outer circumference thereof. Meanwhile, when the linear velocity exceeds the maximum linear velocity in the outer circumference of the disc, the CAV scheme is switched to the CLV scheme.

In JP-A-2003-141732, the following control method has been described: Namely, in the PCAV scheme, the recording state is monitored in real time. Moreover, if the recording state becomes deteriorated, regardless of the laser capability, the revolution scheme for the disc is switched from the CAV scheme to the CLV scheme at this point-in-time when the recording state becomes deteriorated.

When the record and reproduction are performed in an optical disc device, a time for performing data exchange with a host is determined in advance by the OS or an application on the host side. Accordingly, the data exchange by a certain predetermined amount needs to be performed within this time. In order to modify speed of the record and reproduction by changing the revolution velocity of the optical disc, a time for awaiting stabilization and settlement of the revolution is required. Consequently, a timing with which the speed is to be modified becomes important for performing the data exchange within the above-described determined time.

In JP-A-2000-173153, there has been a description: "When reproducing a different location on the optical disc by displacing an optical head by one track or more in the radial direction of the optical disc, the above-described number of revolutions is so configured as to be set at the maximum value of the numbers of revolutions at the above-described plurality of stages". There exists a problem, however, that the number of revolutions will not change unless the processing of displacing the optical head enters based on some trigger or opportunity.

In JP-A-2003-51123, there has been a description: "During a time-interval in which a reading head will have passed through a gap, the reading speed is changed at high speed". There exists a problem, however, that changing the reading speed in a state where a tracking servo is swished ON gives rise to an instability in terms of performance. Moreover, no consideration has been given to a case where data existed in a spare area in proximity to the gap.

By enhancing a trigger with which the speed is to be modified, if an optical disc device can be provided where the time needed for the record or reproduction is not so prolonged as compared with a time needed for the record or reproduction according to the shortest specification of the optical disc and the optical disc device, it can be said to be more advantageous.

It is an object of the present invention to provide an optical disc device and an optical disc record reproducing method which allow implementation of the stable-mannered and high-speed record and reproduction.

The object of the present invention can be accomplished by a configuration that, as its one example, a spindle motor is controlled in such a manner that a seek processing is selected and used as its trigger.

According to the present invention, it becomes possible to provide an optical disc device and an optical disc record reproducing method which allow implementation of the stable-mannered and high-speed record and reproduction.

BRIEF DESCRIPTION OF THE DRAWINGS

These and other features, objects and advantages of the present invention will become more apparent from the following description when taken in conjunction with the accompanying drawings wherein.

DESCRIPTION OF THE INVENTION

Figure 1:
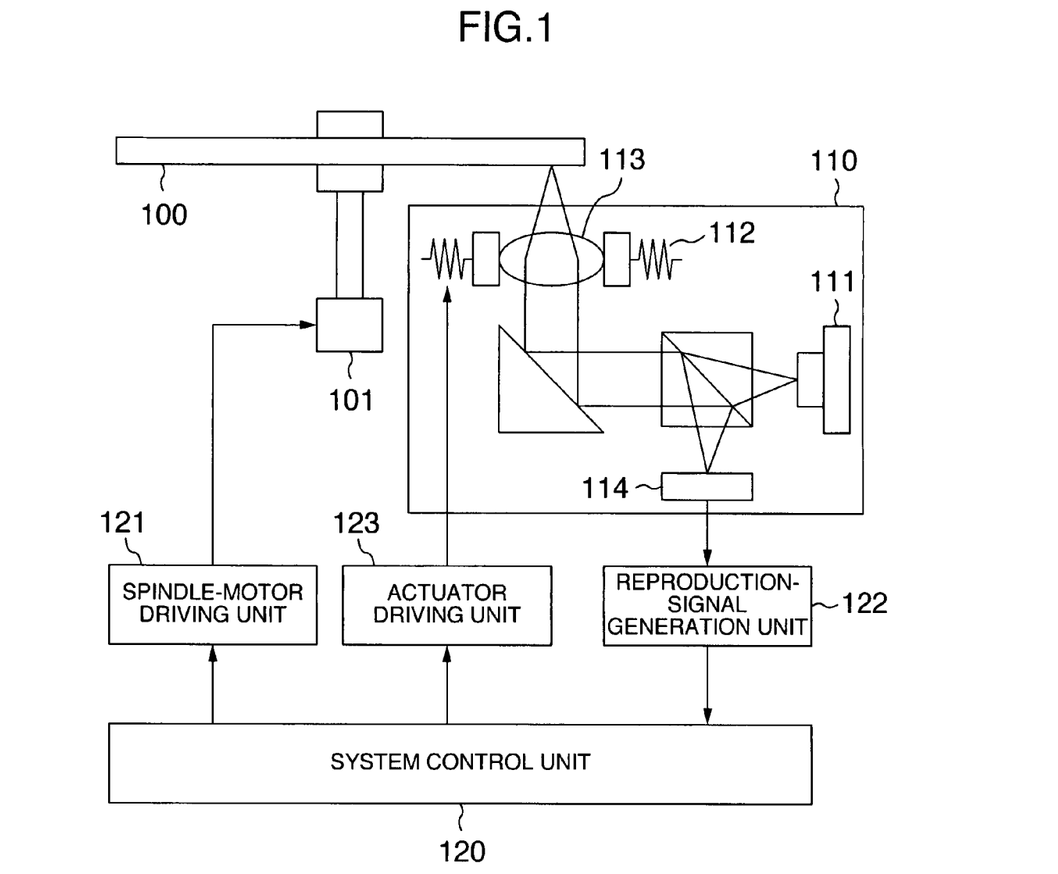
FIG. 1 is an optical disc device.

Hereinafter, referring to the drawings, the explanation will be given below concerning embodiments of the present invention. An optical disc device of the present invention may be whatever device of a reproduction-specific device, a record-specific device, and a record and reproduction device.
[Embodiment 1]
FIG. 1 is a block diagram for illustrating the configuration of an optical disc device according to the present embodiment.

Reading, deletion, or writing of information is performed with respect to an optical disc 100 by the illumination of laser light from an optical pickup 110. Also, the optical disc 100 is revolved by a spindle motor 101 which is driven by a spindle-motor driving unit 121 that receives a signal from a system control unit 120.

The laser light emitted from a laser light source 111 is converged as an optical spot onto an information recording surface of the optical disc 100 by an objective lens 113. Moreover, the laser light is reflected by the optical disc 100, then being detected by an optical detector 114. Here, the objective lens 113 is moved in the radial direction of the optical disc 100 and the focus direction by an actuator 112. Furthermore, a reproduction signal, which is generated by a reproduction-signal generation unit 122 from the signal detected by the optical detector 114, is inputted into the system control unit 120. Here, the reproduction signal is read as data on the optical disc 100. This data includes not only data recorded in the recording surface, but also information such as address information. Also, a seek processing means that the optical pickup 110 and the objective lens 113 are moved in the radial direction of the optical disc 100 so as to displace the optical spot to a desired address.

There exists a case where there occurs the following problem: Namely, the data cannot be correctly reproduced due to deterioration of the recording quality during the reproduction, or a delay occurs in the seek processing because a servo control system is instable. In the case like this, in some cases, a countermeasure is taken where the reproduction speed is lowered thereby to enhance the reproduction performance and seek processing performance. In general, if the reproduction speed is lowered, the reproduction performance is enhanced, and revolution velocity of the spindle motor is lowered. As a result, the performance of the servo control system is stabilized, which allows the enhancement in the seek processing performance.

Figure 2:
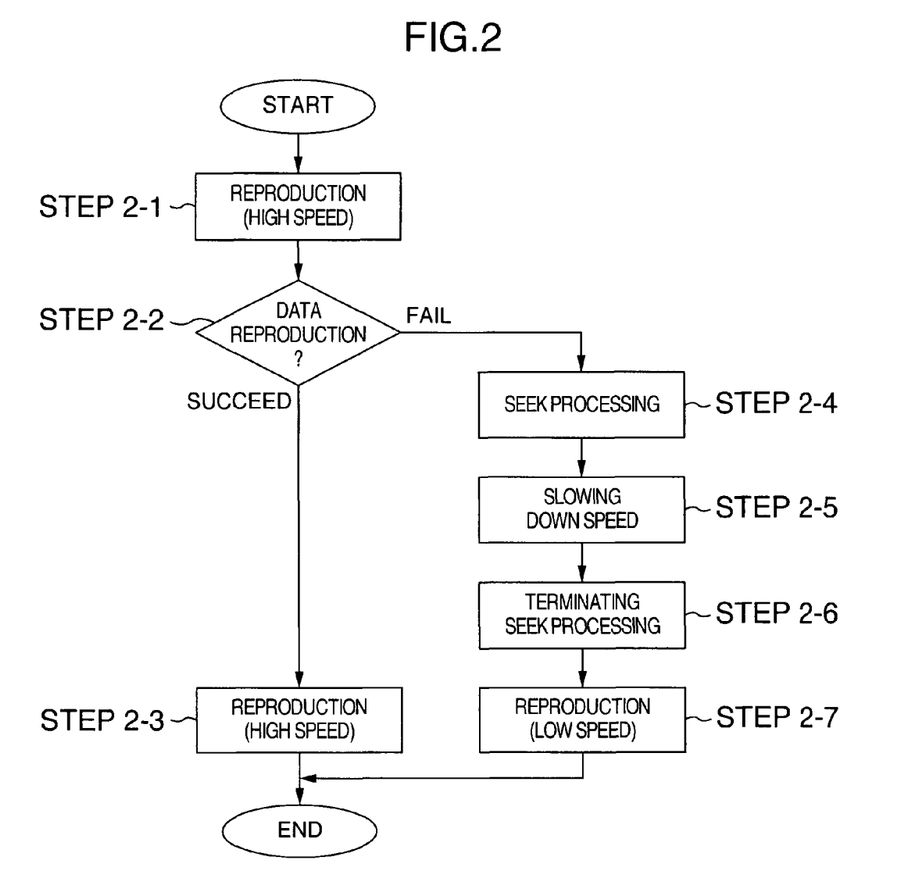
FIG. 2 is a flowchart.
Figure 3:
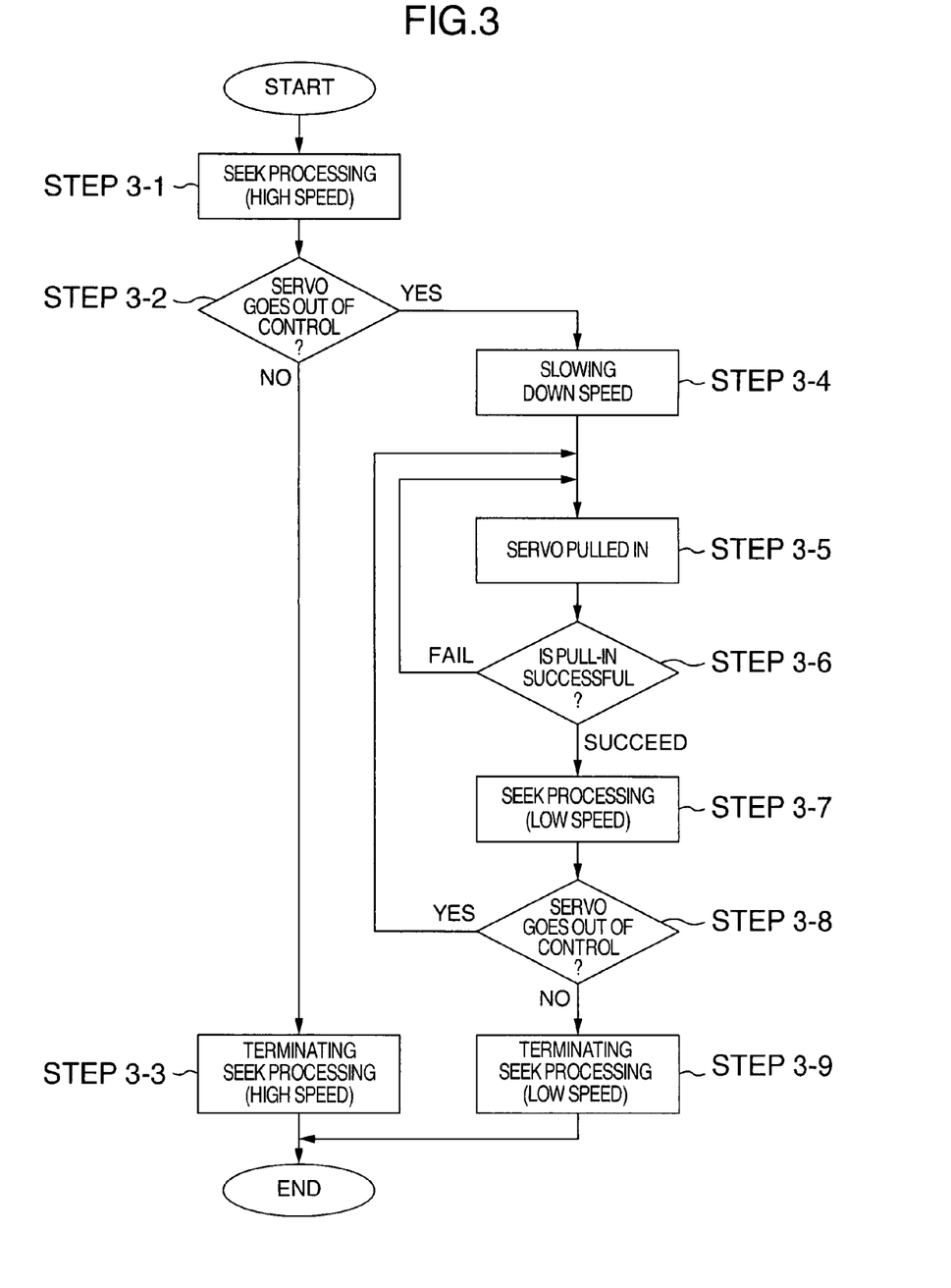
FIG. 3 is a flowchart.

Hereinafter, the explanation will be given below concerning a conventional technology on the modification of the reproduction speed and the revolution velocity. FIG. 2 and FIG. 3 illustrate flowcharts of this processing.

It is assumed that both the optical disc device and the optical disc 100 are compatible with the two-fold speed or more record or reproduction. The reproduction of data is under way at the highest reproduction speed implemented according to the specification (step 2-1). It is judged whether or not the reproduction of the data has been successful (step 2-2). If the reproduction has been successful, the reproduction is continued at the highest reproduction speed as it is (step 2-3). Meanwhile, if, at the step 2-2, the reproduction has failed, in order to read the data once again, the optical disc device is going to return to the reading by performing a seek processing (step 2-4). The revolution velocity of the spindle motor is slowed down in such a manner that this seek processing is selected and used as its trigger, thereby slowing down the reproduction speed (step 2-5). Then, the optical spot reaches the target address, and the seek processing is terminated (step 2-6). Moreover, the reproduction is performed again in the state where the reproduction speed is slowed down (step 2-7). In this way, the modification of the reproduction speed is performed in such a manner that the seek processing is selected and used as its trigger.

It is assumed that both the optical disc device and the optical disc 100 are compatible with the two-fold speed or more record or reproduction. A seek processing is performed while the record or reproduction of data is under way at the highest speed implemented according to the specification (step 3-1). It is confirmed whether or not a servo control system goes out of control during the seek processing (step 3-2). If, at the step 3-2, the servo control system does not go out, the seek processing is terminated while maintaining the highest speed of the specification as it is (step 3-3). Meanwhile, if, at the step 3-2, the servo control system goes out of the control, the revolution velocity is slowed down (step 3-4). Moreover, the servo control system is newly pulled in again (step 3-5), and it is confirmed whether or not the pull-in of the servo control system has been successful (step 3-6). If, at the step 3-6, the pull-in has failed, the optical disc device returns to the step 3-5. Meanwhile, if, at the step 3-6, the pull-in has been successful, the seek processing is continued (step 3-7). Then, it is confirmed again whether or not the servo control system goes out of the control during the seek processing (step 3-8). If, at the step 3-8, the servo control system goes out of the control, the optical disc device returns to the step 3-5. Meanwhile, if, at the step 3-8, the servo control system does not go out, the seek processing is terminated at the revolution velocity which is slowed down at the step 3-4 with reference to the one before the seek processing (step 3-9). In this way, even if the problem occurs in the seek processing at the high speed, by lowering the speed and implementing the low-speed seek processing, the seek processing can be stably controlled in comparison with the high-speed case.

In this conventional technology, however, there exists a problem, which will be described hereinafter: Namely, as described above, the record or reproduction is performed in the state where the record or reproduction speed remains slowed down. As a result, it turns out that the time needed for the record or reproduction is prolonged as compared with the case where the record or reproduction is performed at the highest speed implemented according to the specification of the optical disc 100 and the optical disc device. Moreover, consider a case where, if a slow down of the speed takes place in an inner circumference of the optical disc 100, the record or reproduction of the optical disc 100 is performed from the inner circumference to the outer circumference without restoring the speed of the record or reproduction thereinafter back to the highest speed implemented according to the specification of the optical disc 100 and the optical disc device. In this case, the time needed for the record or reproduction is increased as compared with the case where the slow down of the speed did not take place.

In view of this situation, the following technology has been devised in the present embodiment: Namely, if a slow down of the speed takes place, a processing for speeding up the speed is inserted after the slow down of the speed is over. Also, a seek processing is selected and used as the trigger with which the speed is to be speeded up. Here, if the continuous reproduction is continued, the seek processing can not be inserted. Accordingly, the optical disc is virtually separated into several zones, and the seek processing is inserted into zone switching portions between the zones. This allows seek processings to be inserted on a regular basis during the record or reproduction, thereby permitting the seek processings to become the triggers with which the speed is to be speeded up.

Assuming that the optical disc 100 is a DVD-RAM disc, the concrete explanation will be given below. The DVD-RAM disc (12 cm in diameter) includes address information portions referred to as "PID (Physical ID). The address information portions separate one circumference into a plurality of sectors. Here, the zone separation is performed for each area where the number of the sectors of one circumference is the same. This results in creation of 35 zones, and also a seek processing is made to be performed in the zone switching portions. As a result, even if a slow down of the speed takes place in a zone existing in an inner-circumference portion, it turns out that the speed is restored back again at a position which is about to enter the next zone. Consequently, the reproduction is performed at a low speed only at a zone where there exists a portion having the bad record performance.

Figure 4:
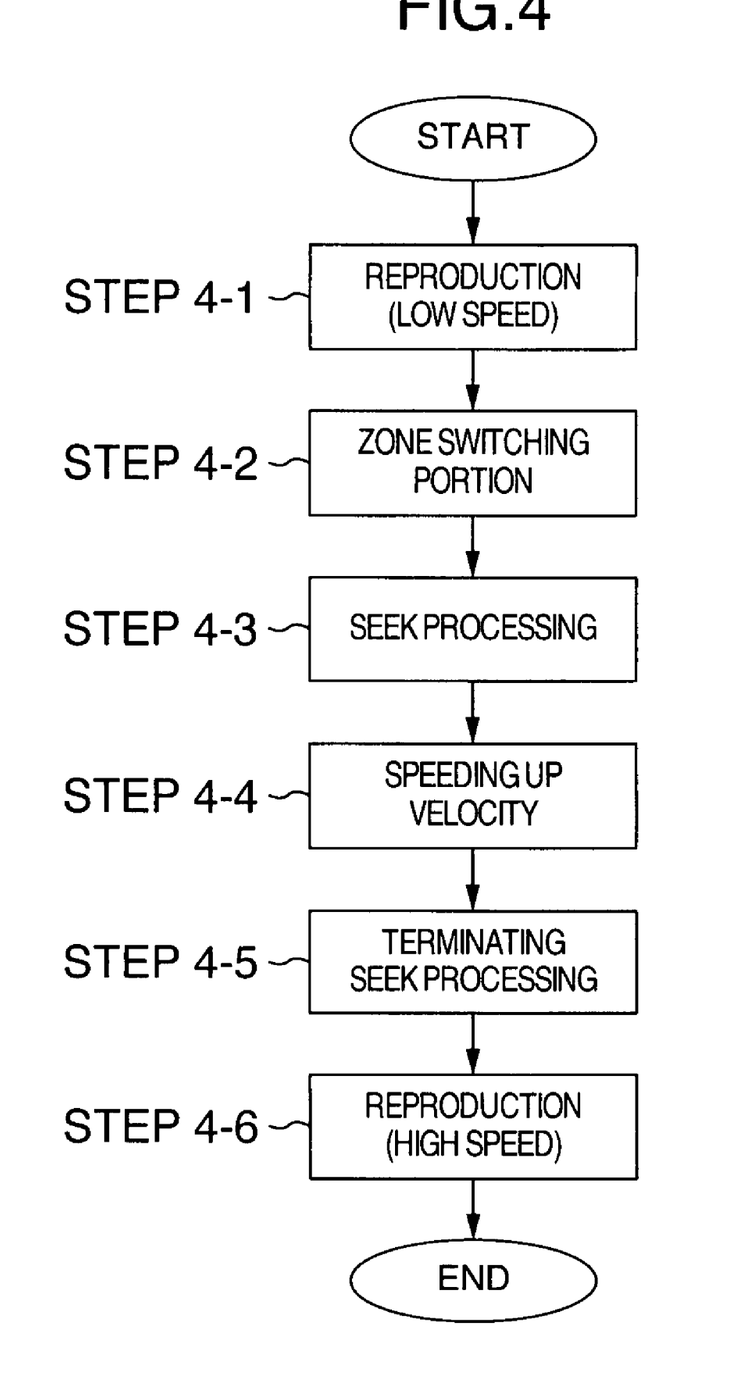
FIG. 4 is a flowchart.

Referring to FIG. 4, the concrete explanation will be given below concerning steps of the present processing. FIG. 4 illustrates a flowchart of the case where the speed is speeded up by a seek processing in a zone switching portion. The reproduction is being performed in a state where the reproduction speed has been already slowed down for the reason as was indicated in FIG. 2 or FIG. 3 (step 4-1). The optical spot reaches a zone switching portion (step 4-2). Since, in the present invention, a seek processing is supposed to be performed in a zone switching portion, a seek processing is started (step 4-3). The revolution velocity is speeded up in such a manner that this seek processing is selected and used as its trigger (step 4-4). Then, the seek processing is terminated (step 4-5). Moreover, the reproduction is continued at a reproduction speed which is now higher than the reproduction speed before the optical spot has reached the zone switching portion (step 4-6).

Figure 5A:
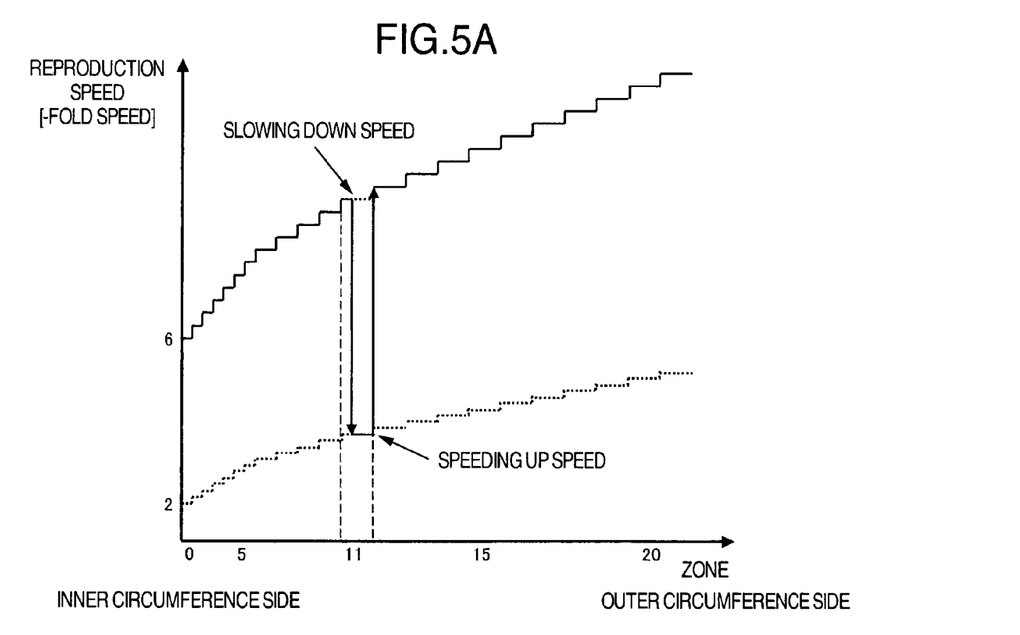
FIG. 5A and FIG. 5B are explanatory diagrams for data transfer rate of the optical disc device.
Figure 5B:
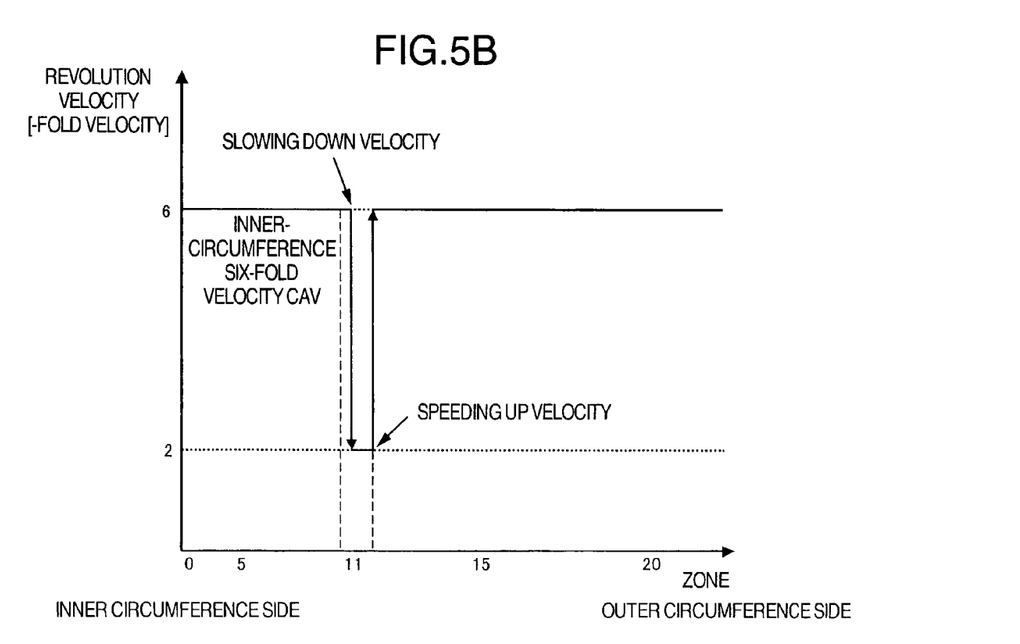

FIG. 5A and FIG. 5B illustrate a manner of the reproduction speed and that of the revolution velocity which correspond to the flowcharts in FIG. 2 and FIG. 4. FIG. 5A illustrates the manner of the reproduction speed, and FIG. 5B illustrates the manner of the revolution velocity. The overall operation is the manner of the reproduction speed and that of the revolution velocity in the following case: Namely, during the reproduction performed by a pseudo CAV control of inner-circumference six-fold velocity, the revolution velocity is slowed down to a pseudo CAV control of inner-circumference two-fold velocity by the velocity modification, then being restored back to the pseudo CAV control of the inner-circumference six-fold velocity once again. First, assuming that the innermost circumference is a zone 0, the reproduction is continued by the pseudo CAV control at the reproduction speed and the revolution velocity of the inner-circumference six-fold velocity. At this time, however, the reproduction of data is found to be unsuccessful, since this stage is equivalent to the processing illustrated in FIG. 2 where the data reproduction has failed. Accordingly, the revolution velocity is slowed down to the pseudo CAV control of the inner-circumference two-fold velocity (zone 11). In correspondence with this, in FIG. 5A, the reproduction speed is slowed down halfway in the zone 11, although the reproduction speed has been gradually speeded up from the inner-circumference six-fold velocity because this control is the pseudo CAV control. Meanwhile, in FIG. 5B, the revolution velocity is slowed down to the pseudo CAV control of the inner-circumference two-fold velocity halfway in the zone 11, although the revolution has continued while maintaining the revolution velocity of the inner-circumference six-fold velocity because this control is the pseudo CAV control. Next, in the processing illustrated in FIG. 4, the reproduction speed and the revolution velocity are restored again in such a manner that the seek processing to be inserted in the zone switching portion is selected and used as its trigger (zone 12). In correspondence with this, in FIG. 5A, the reproduction speed is speeded up from the one by the pseudo CAV control of the inner-circumference two-fold velocity to the one by the inner-circumference six-fold velocity in the zone switching portion from the zone 11 to the zone 12. Also, in FIG. 5B as well, the revolution velocity is speeded up from the one by the pseudo CAV control of the inner-circumference two-fold velocity to the one by the inner-circumference six-fold velocity in the zone switching portion. The operation described so far permits the reproduction to be performed at the low speed in only a part of the zone 11, thereby making it possible to avoid exerting significant influences on the overall reproduction time.

In the above-described explanation, the embodiment has been indicated where the reproduction speed and the revolution velocity are speeded up in such a manner that a seek processing in a zone switching portion is selected and used as its trigger. Furthermore, a seek processing in a location other than the zone switching portion is also available.

[Embodiment 2]

The configuration of an optical disc device according to the present embodiment is the same as the one illustrated in FIG. 1 in the first embodiment.

In the first embodiment, the speeding-up of the record or reproduction speed is performed such that a seek processing is selected and used as its trigger. Furthermore, this seek processing has been allowed to be not only a seek processing in a zone switching portion, but also a seek processing which occurs in a location other than the zone switching portion. In the present embodiment, however, the seek processing which becomes a trigger for the speeding-up of the record or reproduction speed is limited to a seek processing in a zone switching portion. Namely, in the first embodiment, even if the optical disc is not separated into the zones, the speeding-up of the record or reproduction speed is performed if a seek processing occurs by some factor or other. In the present embodiment, however, performing the speeding-up of the record or reproduction speed absolutely requires that the optical disc be separated into the zones. For example, in the DVD-RAM disc, a spare area exists in addition to a data area in which data is usually recorded. If the recording film of the data area is deteriorated, information which is to be recorded into its address is recorded into the spare area. As a result, it turns out that a seek processing into the spare area becomes required, and that the seek processing occurs in the location other than the zone switching portion. In the present embodiment, the speeding-up of the record or reproduction speed is not performed in this seek processing. Also, after the speeding-up is performed such that the seek processing is selected and used as its trigger, if a delay occurs in the seek processing due to a cause that the servo control system goes out of the control or the like, the seek processing is continued at a low speed by slowing down the revolution velocity again. Then, the record or reproduction is performed with the low speed maintained.

This operation is performed in order to address the following problem: Namely, a time for performing data exchange with a host is limited by the OS or an application. Accordingly, it is preferable that, during the exchange of data by a predetermined amount, the seek processing time be made shorter, and that the number of the seek processings be made smaller. As a result, the data transfer is requested from the host side on a certain predetermined amount basis. Consequently, it is desirable that, during the transfer of the data by the predetermined amount, no other seek processings be permitted to be performed except for the seek processing which becomes the trigger for the speeding-up. Also, after the revolution velocity has been speeded up such that the seek processing is selected and used as its trigger, if there occurs the situation which delays the seek processing, e.g., the servo control system goes out of the control, the highest priority is given to the operation that the stable seek processing is performed by slowing down the revolution velocity, and that the seek processing is terminated. Namely, the seek processing which becomes the trigger for the speeding-up is only the seek processing in the zone switching portion. Accordingly, unless the servo control system goes out of the control or the like, the speed modification can be terminated by the one-time seek processing. On the other hand, in the seek processing into the spare area, there is a possibility that go-and-return two-time seek processings may become required.

Referring to FIG. 4 used in the first embodiment, the concrete explanation will be given below regarding the above-described problem. When, during the reproduction at the low speed, the optical spot reaches the zone switching portion, and the reproduction speed is speeded up before the data amount requested from the host side is transferred, the processings including the data transfer after the speeding-up need to be performed within the time determined by the OS or an application. Namely, the processings from the step 4-1 to the step 4-6 of the flowchart illustrated in FIG. 4 need to be performed within the predetermined time. If the speeding-up is performed by the seek processing at the time when the optical spot displaces into the spare area, the optical spot must return to the data area again after reproducing the data in the spare area. In this return seek processing, a time for stabilization and settlement of the revolution is further required. This heightens a possibility of being incapable of transferring the data within the predetermined time. Consequently, in the present embodiment, the speeding-up is performed by only the seek processing which occurs in the zone switching portion, i.e., the seek processing which requires only the one-time processing.

Figure 6:
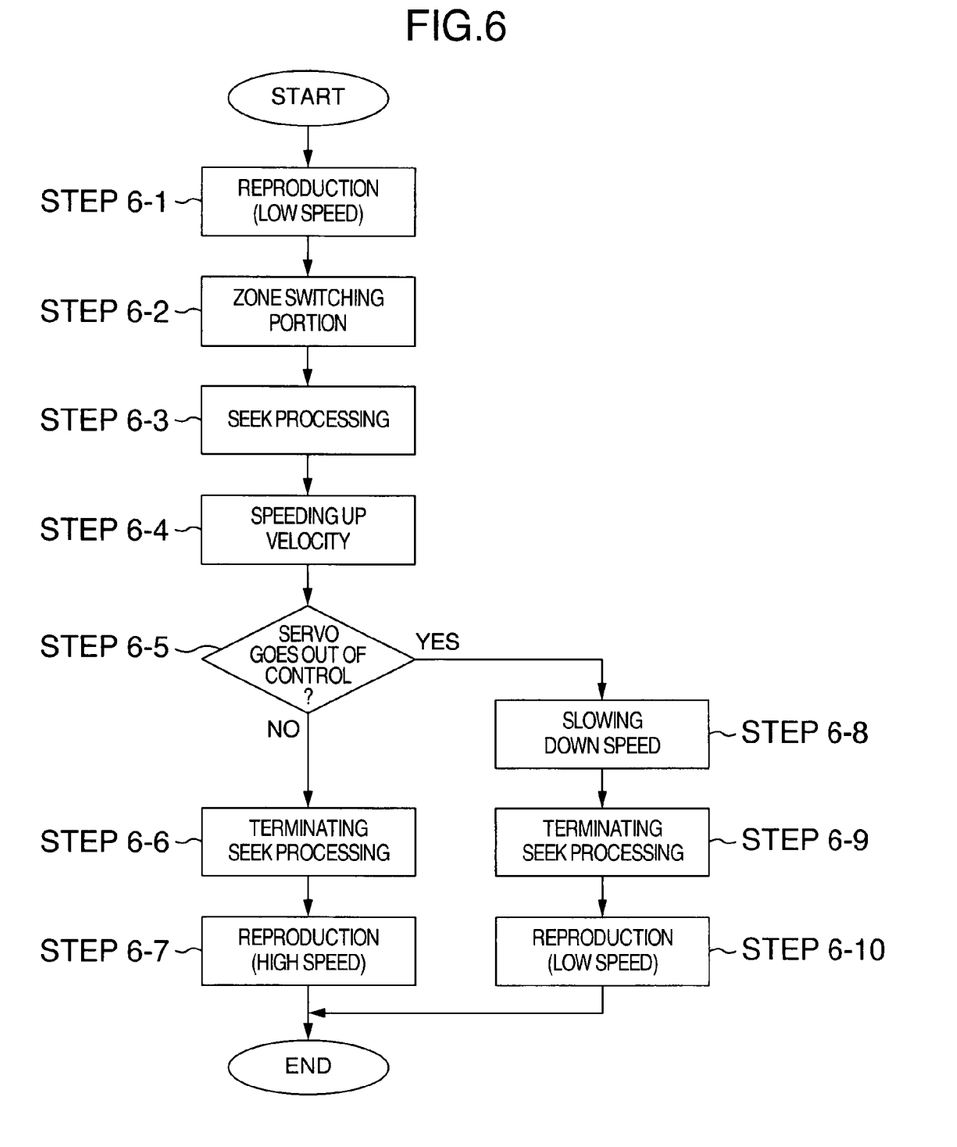
FIG. 6 is a flowchart.

In the present embodiment, the speeding-up is implemented such that a seek processing in a zone switching portion is selected and used as its trigger. Here, the explanation will be given below concerning a case where a problem occurs in this seek processing for performing the speeding-up. As illustrated in the flowchart in FIG. 3, the speed is slowed down again. Referring to FIG. 6, the concrete explanation will be given below regarding details of the present embodiment. FIG. 6 illustrates a processing in a case where a delay occurs in a seek processing which becomes a trigger for the speeding-up. The reproduction is being performed in a state where the reproduction speed has been already slowed down for the reason as was indicated in FIG. 2 or FIG. 3, (step 6-1). The optical spot reaches a zone switching portion (step 6-2). A seek processing is started in the zone switching portion (step 6-3). The revolution velocity is speeded up such that this seek processing is selected and used as its trigger (step 6-4). The seek processing is continued in the state where the revolution velocity is higher (step 6-5). Then, if at the step 6-5, the servo control system does not go out, the seek processing is terminated in the state where the revolution velocity is higher (step 6-6). The reproduction is continued at a reproduction speed which is now higher than the reproduction speed before the optical spot has reached the zone switching portion (step 6-7). Meanwhile, if, at the step 6-5, the servo control system goes out of the control, the revolution velocity is slowed down, and the seek processing is continued (step 6-8). The optical spot reaches a target address, and the seek processing is terminated (step 6-9). The reproduction is continued at a lower reproduction speed (step 6-10). It is provided with opportunities of speeding up the revolution velocity in the following zone switching portion.

Figure 7A:
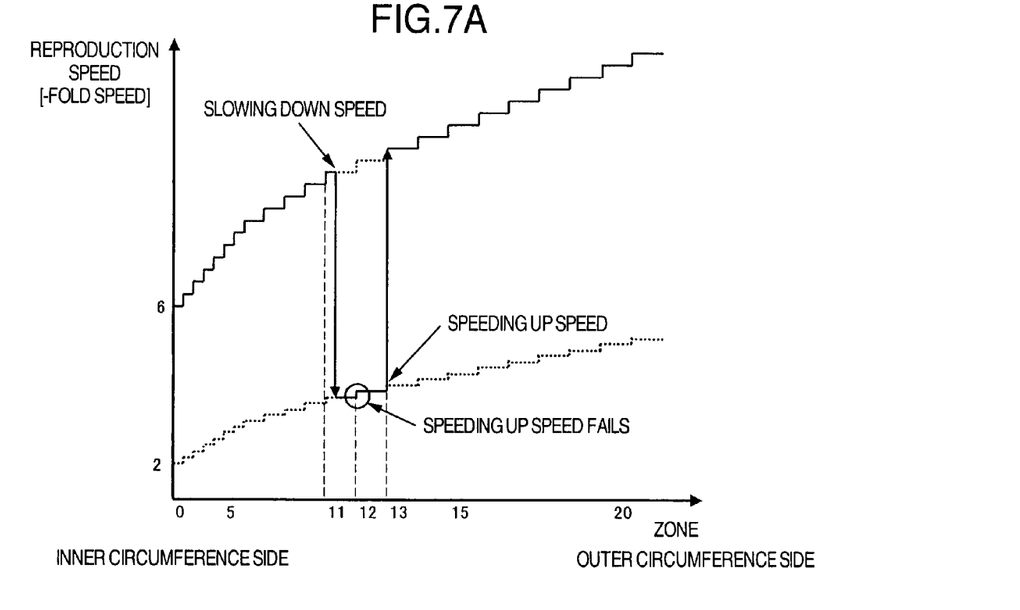
FIG. 7A and FIG. 7B are explanatory diagrams for the data transfer rate of the optical disc device.
Figure 7B:
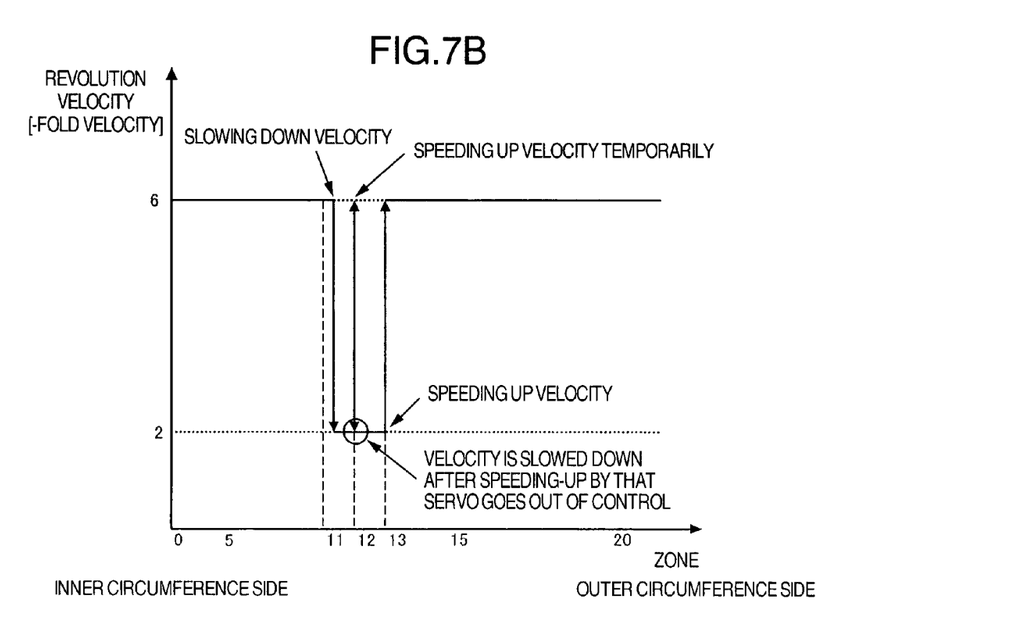

FIG. 7A and FIG. 7B illustrate a manner of the reproduction speed and that of the revolution velocity which correspond to the flowcharts in FIG. 2 and FIG. 6. FIG. 7A illustrates the manner of the reproduction speed, and FIG. 7B illustrates the manner of the revolution velocity. The overall operation is as follows: Namely, in much the same way as FIG. 5A and FIG. 5B, the speed is slowed down in the zone 11 during the reproduction. Then, the speeding-up is tried to be performed by a seek processing in the zone switching portion from the zone 11 to the zone 12. Here, however, a delay occurs in this seek processing. As a result, no subsequent speeding-up is tried, and thus the reproduction is performed at the low speed in the zone 12. First, assuming that the innermost circumference is a zone 0, the reproduction is continued by the pseudo CAV control at the reproduction speed and the revolution velocity of the inner-circumference six-fold velocity. At this time, however, the reproduction of data is found to be unsuccessful, since this stage is equivalent to the processing illustrated in FIG. 2 where the data reproduction has failed. Accordingly, the reproduction speed and the revolution velocity are slowed down to the pseudo CAV control of the inner-circumference two-fold velocity (zone 11). In correspondence with this, in FIG. 7A, the reproduction speed is slowed down halfway in the zone 11, although the reproduction speed has been gradually speeded up from the inner-circumference six-fold velocity because this control is the pseudo CAV control. Meanwhile, in FIG. 7B, the revolution velocity is slowed down to the pseudo CAV control of the inner-circumference two-fold velocity halfway in the zone 11, although the revolution has continued while maintaining the revolution velocity of the inner-circumference six-fold velocity because this control is the pseudo CAV control. Next, in the processing illustrated in FIG. 6 where the servo control system goes out of the control after the speeding-up, the revolution velocity is speeded up such that the seek processing inserted in the zone switching portion is selected and used as its trigger. Here, however, the servo control system goes out of the control before the seek processing has been terminated. As a result, the revolution velocity is slowed down again, and the seek processing is performed. Moreover, the reproduction of the data is continued in the state where the revolution velocity has been slowed down (zone 12). In correspondence with this, in FIG. 7A, the reproduction speed is not speeded up in the zone switching portion from the zone 11 to the zone 12. Accordingly, the reproduction is continued at the reproduction speed of the pseudo CAV control of the inner-circumference two-fold velocity in the zone 12 as well. Meanwhile, in FIG. 7B, the revolution velocity is speeded up temporarily such that the seek processing between the zone 11 and the zone 12 is selected and used as its trigger. However, the servo control system goes out of the control after the speeding-up. As a result, the revolution velocity is slowed down again, and the revolution is continued at the revolution velocity of the pseudo CAV control of the inner-circumference two-fold velocity in the zone 12. Furthermore, in the processing illustrated in FIG. 6 where the servo control system does not go out until the seek processing has been terminated after the speeding-up, the revolution velocity is speeded up in the next zone switching portion from the one by the pseudo CAV control of the inner-circumference two-fold velocity to the one by the inner-circumference six-fold velocity. Consequently, the reproduction is continued at the reproduction speed which is made higher (zone 13). In correspondence with this, in FIG. 7A, the reproduction speed is speeded up to the one by the inner-circumference six-fold velocity in the zone switching portion from the zone 12 to the zone 13. Also, in FIG. 7B as well, the revolution velocity is speeded up from the one by the pseudo CAV control of the inner-circumference two-fold velocity to the one by the inner-circumference six-fold velocity. As described above, if the speeding-up of the reproduction speed and revolution velocity cannot be performed in a short time, the speeding-up is aborted and cancelled. This method prevents so much time from being spent on the seek processing, thereby making it possible to terminate the data transfer within a predetermined time.

[Embodiment 3]

The configuration of an optical disc device according to the present embodiment is the same as the one illustrated in FIG. 1 in the first embodiment. As having been described in the second embodiment, the time for performing data exchange with a host is limited by an application or the OS. Accordingly, in the present embodiment, there is presented a method for allowing the speed modification with a seek processing selected and used as its trigger to be terminated with more certainty and in a shorter time.

Figure 8:
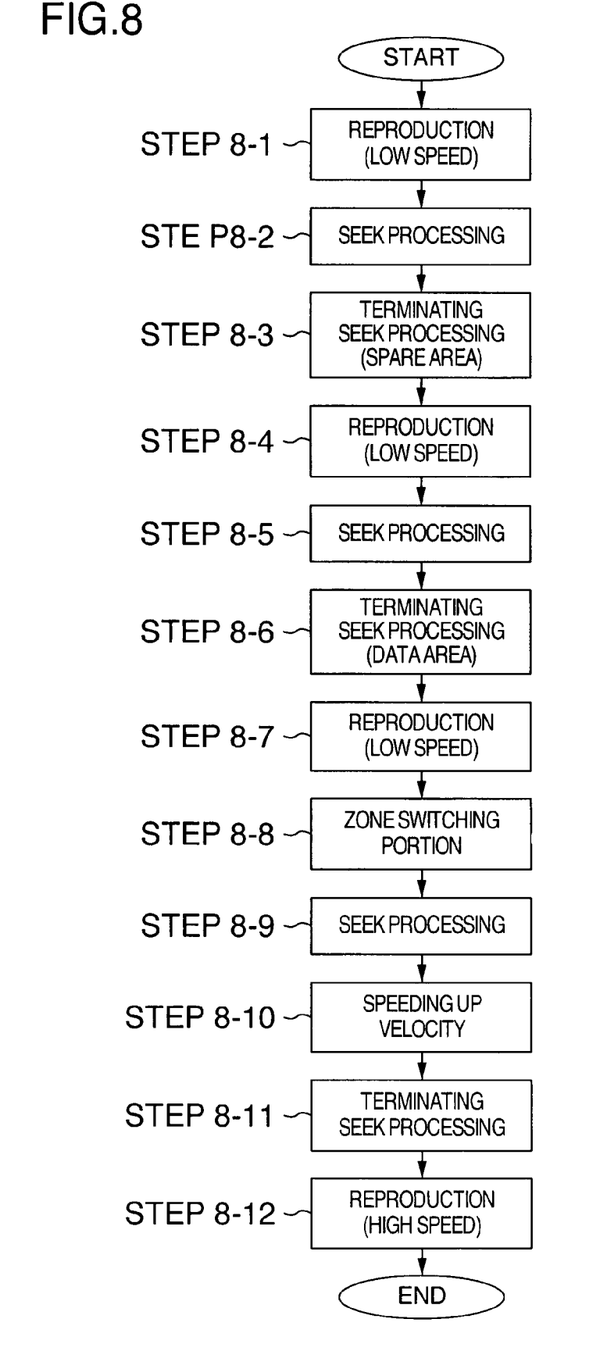
FIG. 8 is a flowchart.

In the second embodiment, the seek processing which becomes a trigger for the speeding-up is limited to a seek processing in a zone switching portion. Meanwhile, in the present embodiment, the condition under which the speeding-up is to be performed is further limited as follows: Namely, when a factor for causing a seek processing to be performed exists in proximity to a zone switching portion, such that data exists in a spare area in proximity to a zone switching portion, no speeding-up will be performed by a seek processing in the zone switching portion FIG. 8 illustrates a flowchart for data transfer in a case where data exists in a spare area immediately before a zone switching portion. Here, just like the second embodiment, the speed modification is performed such that a seek processing in the zone switching portion is selected and used as its trigger.

The reproduction is being performed in a state where the reproduction speed has been already slowed down for the reason as was indicated in FIG. 2 or FIG. 3 (step 8-1). Since subsequent data is recorded in a spare area, a seek processing is performed into the spare area (step 8-2). The seek processing into the spare area is terminated (step 8-3), and the data recorded in the spare area is reproduced (step 8-4). After the data in the spare area has been reproduced, a seek processing for retuning to an original data area is started (step 8-5). The seek processing into the data area is terminated (step 8-6), and data recorded in the data area is reproduced (step 8-7). Moreover, since the optical spot reaches a zone switching portion (step 8-8), a seek processing is started (step 8-9). The reproduction is being performed at the low speed, and this seek processing is the one in the zone switching portion. Accordingly, the revolution velocity is speeded up such that this seek processing is selected and used as its trigger (step 8-10). Then, the seek processing is terminated (step 8-11), and data in the next zone is reproduced (step 8-12).

In the methodology of the second embodiment, there arises a possibility that the above-described processings from the step 8-1 to the step 8-12 will have to be performed within the time determined by an application or the OS.

In the operation illustrated in FIG. 8, unlike the flowchart illustrated in FIG. 4, as many as three-time seek processings are performed. This reduces a possibility of being capable of terminating the data transfer within the time determined by an application or the OS. In the operation illustrated in FIG. 8, the seek processing into the spare area exists before the zone switching portion. The reduction in the possibility, however, is also basically the same in a case where the seek processing into the spare area exists after the zone switching portion and in proximity to the zone switching portion.

In view of this situation, when data exists in a spare area in proximity to a zone switching portion, no speeding-up will be performed such that a seek processing which occurs in the zone switching portion is selected and used as its trigger.

Figure 9:
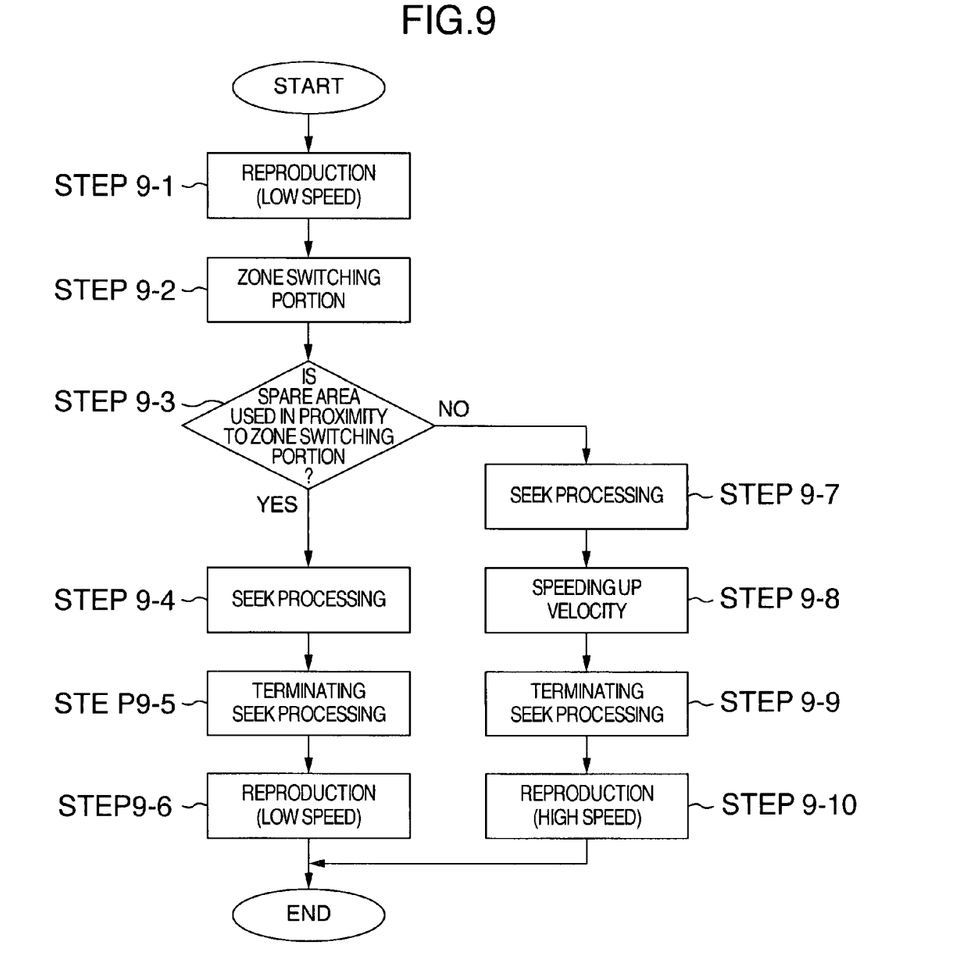
FIG. 9 is a flowchart.

FIG. 9 illustrates a flowchart for a case where data exists in a spare area in proximity to a zone switching portion, and the case other than that. The reproduction is being performed in a state where the reproduction speed has been already slowed down for the reason as was indicated in FIG. 2 or FIG. 3 (step 9-1). The optical spot reaches a zone switching portion (step 9-2). Moreover, it is judged whether or not a spare area is used for the record or reproduction of data at an address in proximity to the zone switching portion (step 9-3). If, at the step 9-3, the judgment result is Yes, a seek processing is performed because of the zone switching portion (step 9-4), and the seek processing is terminated without performing the speed modification (step 9-5). Furthermore, the reproduction is continued with the low speed maintained (step 9-6). Meanwhile, if, at the step 9-3, the judgment result is No, a seek processing is started because of the zone switching portion (step 9-7). Then, the revolution velocity is speeded up such that this seek processing is selected and used as its trigger (step 9-8). Furthermore, the seek processing is terminated (step 9-9), and the reproduction is continued at the high speed (step 9-10).

Figure 10A:
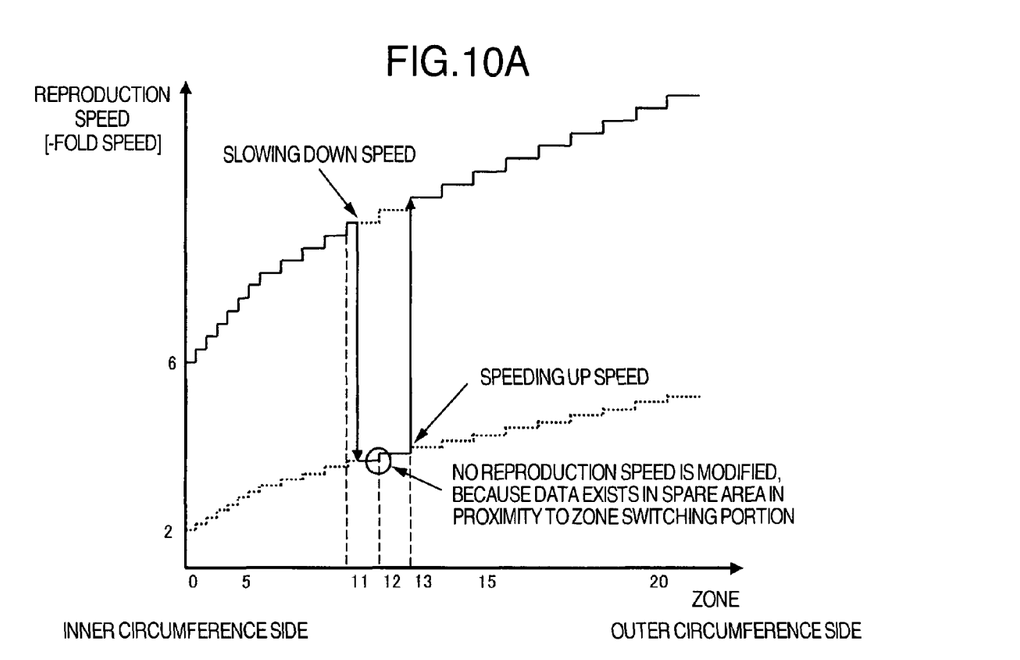
FIG. 10A and FIG. 10B are explanatory diagrams for the data transfer rate of the optical disc device.
Figure 10B:
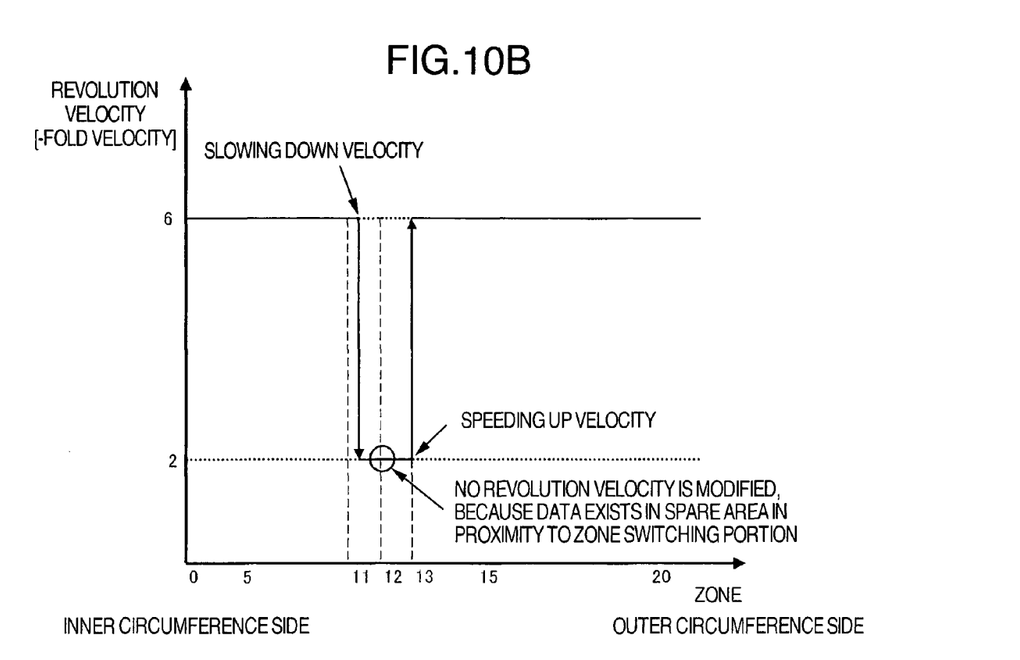

FIG. 10A and FIG. 10B illustrate a manner of the reproduction speed and that of the revolution velocity which correspond to the flowcharts in FIG. 2 and FIG. 9. FIG. 10A illustrates the manner of the reproduction speed, and FIG. 10B illustrates the manner of the revolution velocity. The overall operation is data transfer made in accordance with the following manner: Namely, in much the same way as FIG. 5A and FIG. 5B, the speed is slowed down in the zone 11 during the reproduction. Then, during the reproduction at the low speed, the data is recorded in a spare area in proximity to a zone switching portion when the optical spot passes through the zone switching portion. Accordingly, based on the method explained in FIG. 9, no speeding-up is performed in the zone switching portion. Meanwhile, the speeding-up is performed such that a seek processing in a zone switching portion in proximity to which no data is recorded in the spare area is selected and used as its trigger. First, assuming that the innermost circumference is a zone 0, the reproduction is continued by the pseudo CAV control at the reproduction speed and the revolution velocity of the inner-circumference six-fold velocity. At this time, however, the reproduction of data is found to be unsuccessful, since this stage is equivalent to the processing illustrated in FIG. 2 where the data reproduction has failed. Accordingly, the reproduction speed and the revolution velocity are slowed down to the pseudo CAV control of the inner-circumference two-fold velocity (zone 11). In correspondence with this, in FIG. 10A, the reproduction speed is slowed down halfway in the zone 11, although the reproduction speed has been gradually speeded up from the inner-circumference six-fold velocity because this control is the pseudo CAV control. Meanwhile, in FIG. 10B, the revolution velocity is slowed down to the pseudo CAV control of the inner-circumference two-fold velocity halfway in the zone 11, although the revolution has continued while maintaining the revolution velocity of the inner-circumference six-fold velocity because this control is the pseudo CAV control. Next, the optical spot reaches a zone switching portion. Here, this is the case of the processing explained in FIG. 9 where the data is recorded in a spare area in proximity to the zone switching portion. Accordingly, no speeding-up is performed in the zone switching portion, and the reproduction is continued with the low speed maintained (zone 12). In correspondence with this, in FIG. 10A, the reproduction speed is not speeded up in the zone switching portion from the zone 11 to the zone 12. Consequently, the reproduction is continued in the zone 12 at the reproduction speed of the pseudo CAV control of the inner-circumference two-fold velocity. Also, in FIG. 10B as well, the revolution velocity is not speeded up in the zone switching portion from the zone 11 to the zone 12. Consequently, the revolution is continued in the zone 12 at the revolution velocity of the pseudo CAV control of the inner-circumference two-fold velocity. Furthermore, in the next zone switching portion, this is the case of the processing explained in FIG. 9 where no data is recorded in the spare area in proximity to the zone switching portion.

Accordingly, the revolution velocity is speeded up from the one by the pseudo CAV control of the inner-circumference two-fold velocity to the one by the inner-circumference six-fold velocity. Consequently, the reproduction is continued at the reproduction speed which is made higher (zone 13). In correspondence with this, in FIG. 10A, the reproduction speed is speeded up to the one by the inner-circumference six-fold velocity in the zone switching portion from the zone 12 to the zone 13. Also, in FIG. 10B as well, the revolution velocity is speeded up from the one by the pseudo CAV control of the inner-circumference two-fold velocity to the one by the inner-circumference six-fold velocity.

As described above, if data is recorded in a spare area in proximity to a zone switching portion, and if the speeding-up of the reproduction speed and revolution velocity cannot be performed in a short time, the speeding-up is aborted and cancelled. This method prevents so much time from being spent on the seek processing, thereby making it possible to terminate the data transfer within a predetermined time.

As having been described so far, according to the present embodiment, the disc is separated into the zones, then performing a seek processing in a zone switching portion therebetween. This feature makes it possible to regularly generate a seek processing which becomes a trigger for modifying the revolution velocity. Also, according to the present embodiment, the revolution velocity is modified in a seek processing in which the tracking servo system falls into the OFF state. This feature makes it possible to modify the revolution velocity stably, and further makes it possible to change characteristics of the tracking servo system in response to the velocity. Also, according to the present embodiment, in the case where there exists the condition that a seek processing occurs in proximity to a zone switching portion, modification of the revolution velocity is not performed in the zone switching portion. Instead, the revolution velocity is modified in a case where the revolution velocity can be modified in a stable state.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

The invention claimed is:

1. An optical disc device capable of setting up an optical disc thereon, comprising:
   an optical pickup which irradiates said optical disc with a laser spot,
   a spindle motor which revolves said optical disc,
   a spindle-motor driving module which drives said spindle motor, and
   a control module which controls said optical pickup and said spindle-motor driving module, wherein
   said control module manages recording area of said optical disc such that said recording area is separated into a plurality of zones,
   wherein when a data transfer speed is decreased from a high data transfer speed to a low data transfer speed, then:
      the data transfer speed is maintained in the low data transfer speed when the laser spot is radially displaced to a boundary between a current zone and an adjacent zone and the data at the boundary is discontinuous; and
      the data transfer speed is increased to the high data transfer speed when the laser spot is radially displaced to a boundary between the current zone and an adjacent zone and the data at the boundary is continuous.

2. The optical disc device according to claim 1, wherein said optical disc device is compatible with record or reproduction of a DVD-RAM disc.

3. The optical disc device according to claim 1, wherein when the data transfer speed is increased to the high data transfer speed from the low data transfer speed, if a delay occurs in said seek processing, then said control module terminates said seek processing.

4. An optical disc record reproducing method of recording or reproducing information into/from an optical disc, said reproducing method, comprising the steps of:
   managing recording area of said optical disc such that said recording area is separated into a plurality of zones, and performing a seek processing of displacing a laser spot in a radial direction of said optical disc in a zone switching portion of said optical disc,
   decreasing the number of revolutions of a spindle motor if the data recording or data reproduction becomes deteriorated,
   maintaining a data transfer speed at a decreased speed in a boundary between one zone and an adjacent zone, when the data transfer speed has been decreased from a higher speed to the decreased speed and data in the boundary is discontinuous, and
   increasing the data transfer speed from the decreased speed to the higher data speed in a boundary between the one zone and an adjacent zone, when the data transfer speed has been decreased from the higher speed to the decreased speed and data in the boundary is continuous.

* * * * *